Patented Apr. 4, 1950

2,502,507

UNITED STATES PATENT OFFICE 2,502,507

DITHIOCYANOGEN ADDUCTS OF ESTERS OF 4-HYDROXYBUTADIENE-1,2, AND PROCESS OF MAKING SAME

Donald Drake Coffman and John Thomas Maynard, Wilmington, Del., assignors to E. I. du Pont de Nemours & Company, Wilmington, Del., a corporation of Delaware No Drawing. Application September 23, 1947, Serial No. 775,752

6 Claims. (Cl. 260—454)

This invention relates to a new class of organic unsaturated thiocyano compounds. More particularly, it relates to monoethylenic compounds containing two vicinal thiocyano groups, one of which is attached to the doubly bonded carbon.

An object of this invention is to provide a hitherto unknown class of unsaturated dithiocyano compounds. Another object is to provide a convenient method of preparing these compounds. Other objects will appear hereinafter.

These objects are accomplished by the invention of compounds having the 2,3-dithiocyanopropene

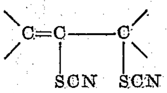

structure, i. e. of compounds having an ethylenic double bond between two carbons one of which bears a thiocyano group and is attached, by a single bond, to a third carbon likewise bearing a thiocyano group. The invention also includes the process for preparing these compounds which consists in adding thiocyanogen to one of the double bonds of a compound having an allenic structure.

The compounds of this invention contain, in an acyclic chain, the skeleton

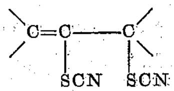

the remaining valences on the carbon atoms being satisfied by monovalent atoms or groups. In a preferred embodiment of the invention, one of these remaining valences is satisfied by an esterified hydroxymethyl group, the others being satisfied by hydrogen. Compounds of this class have valuable pesticidal properties.

Addition of one mole of thiocyanogen to an allenic compound, i. e., a compound containing the grouping

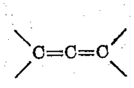

may give two position isomers, except in the case of allene itself or of symetrically substituted allenes. Cis and trans isomers are also possible. In all cases, however, the addition product has the fundamental 2,3-di(thiocyano)propene structure,

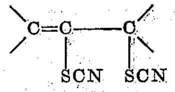

It has been observed that no further addition of thiocyanogen takes place at the double bond of the 2,3-di(thiocyano)propenes, i. e., tetrathiocyano addition products are not obtained in the process of the invention.

The allenic starting materials may be obtained by methods described in the literature. The specific allenic compounds used in the examples which follow, as well as a number of other compounds suitable in the process of the invention, may be prepared by methods described in U. S. Patent 2,073,363. Thiocyanogen may be prepared by the methods set forth in Organic Reactions, volume III, at pages 251–252.

The following examples in which parts are by weight are illustrative of the invention.

*Example I*

A solution of 55 parts of chloro-4-butadiene-1,2 and 73 parts of thiocyanogen (equimolar quantities) in 1000 parts of benzene in a vessel made of glass transmitting ultraviolet light was irradiated at 30–40° C. with a commercial sun lamp emitting light rich in ultraviolet radiations. The source of illumination was located about six centimeters from the side of the reaction vessel. After six hours' irradiation, the solvent was evaporated under reduced pressure, leaving a crystalline residue which, on being twice recrystallized from alcohol, gave 49 parts (38% yield) of white crystals melting in the range 64–72° C. This material was a dithiocyano addition product of chloro-4-butadiene-1,2.

Analysis—Calculated for $C_6H_5N_2ClS_2$: C, 35.20%; H, 2.46%, Cl, 17.32%; S, 31.25%. Found: C, 35.42%; H, 2.34%; Cl, 17.80%; S, 31.20%.

When the product was allowed to crystallize very slowly from alcohol two types of crystals were formed. These were separated manually and each crystal form was recrystallized twice from 85% ethanol. One crystal form appeared as wide platelets, M. P. 81–83.5° C., and the other as irregular feathery crystals, M. P. 80–83° C. A mixture of the two species melted at 70–79° C.

and the X-ray diffraction patterns of the two crystal forms were found to be different. These observations together with the fact that each crystal form analyzed correctly for the formula $C_6H_5N_2ClS_2$ indicated that the reaction had produced two isomeric dithiocyanogen addition products of chloro-4-butadiene-1,2.

*Example II*

A solution of 37 parts of acetoxy-4-butadiene-1,2 and 37.5 parts of thiocyanogen in 600 parts of benzene was treated as described in Example I. Crystallization of the reaction residue from alcohol gave 18 parts (24% yield) of yellowish crystals melting at 69–71° C. In this case the melting point of the product showed that it consisted essentially of only one isomeric form. Analysis showed that it was a dithiocyano addition product of acetoxy-4-butadiene-1,2.

Analysis—Calculated for $C_8H_8O_2N_2S_2$: C, 41.90%; H, 3.96%; S, 27.96%; N, 12.22%. Found: C, 42.24%; H, 3.81%; S, 27.7%; N, 12.36%.

The reaction is applicable to any compound having an allenic structure such as allene, methylallene, dimethylallene, hydroxy-4-butadiene-1,2, phenoxy-4-butadiene-1,2 and the like. As already mentioned, the resulting dithiocyano addition products are in most cases mixtures of isomers, although all of them have the fundamental 2,3-di(thiocyano) propene structure. These new compounds are valuable intermediates in chemical syntheses because of their reactive thiocyano and ethylenic functions. Of special interest are the dithiocyano addition products of esters (e. g., chloride, bromide, formate, acetate, propionate, trichloroacetate, butyrate, benzoate, phthalate, etc.) of hydroxy-4-butadiene-1,2, for the reason that these addition products are of value as insect control agents, particularly against aphids and red spiders. The insecticidal properties are particularly marked with the dithiocyano addition products of esters of hydroxy-4-butadiene-1,2 with saturated aliphatic carboxylic acids of 1 to 4 carbon atoms.

The addition of thiocyanogen to allenic compounds may be carried out by any suitable procedure. For example, the thiocyanogen may be used in the free state or it may be generated in situ from a metal thiocyanate and bromine according to known methods. The reaction is preferably carried out in an inert solvent such as benzene, carbon tetrachloride, carbon bisulfide, ether, acetic acid and the like. The solvent should of course be essentially anhydrous since thiocyanogen is readily hydrolyzed. The reaction temperature should be kept as low as is consistent with a practical reaction rate in order to prevent undesirable polymerization of the thiocyanogen. A satisfactory temperature range is from −10° C. to 60° C., the preferred range between 0–40° C. Since the reaction proceeds slowly in the dark, it is preferable to operate in sunlight or with an artificial source of light, preferably one rich in ultraviolet radiations.

The 2,3-di(thiocyano) propenes are in general solid materials which may be purified, if desired, by recrystallization from appropriate solvents or by distillation at reduced pressure, preferably molecular distillation. For many purposes no purification is necessary. Similarly, it is in general unnecessary to separate the isomers which are formed in many cases.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of thiocyanogen adducts of 4-chlorobutadiene-1,2 which comprises irradiating with light in the ultra violet range a mixture of 4-chlorobutadiene-1,2 and thiocyanogen, the irradiation being of sufficient intensity and employed for a time sufficient to produce substantial addition.

2. A process for the preparation of thiocyanogen adducts of esters of 4-hydroxybutadiene-1,2 which comprises irradiating with light in the ultra violet range a mixture of an ester of 4-hydroxybutadiene-1,2 and thiocyanogen, the irradiation being of sufficient intensity and employed for a time sufficient to produce substantial addition.

3. The dithiocyanogen adduct of 4-chlorobutadiene-1,2, a white crystalline product of the formula $$(C_4H_5Cl)(SCN)_2$$

and of melting point in the range 64–72°C.

4. The dithiocyanogen adduct of an ester of 4-hydroxybutadiene-1,2.

5. The dithiocyanogen adduct of an ester of 4-hydroxybutadiene-1,2 with a saturated aliphatic carboxylic acid of one to four carbon atoms.

6. The dithiocyanogen adduct of the acetate of 4-hydroxybutadiene-1,2.

DONALD DRAKE COFFMAN.
JOHN THOMAS MAYNARD.

REFERENCES CITED

The following references are of record in the file of this patent:

UNITED STATES PATENTS

| Number | Name | Date |
|---|---|---|
| 2,169,700 | Loane et al. | Aug. 15, 1939 |

OTHER REFERENCES

Von Braun et al., "Ber. Deut. Chem. Ges.," vol. 55 (1922), page 3549.

Soderback, "Annalen der Chemie," vol 443 (1925), pages 142–161.

Bruson et al., "J. Am. Chem. Soc.," vol 50 (1928), pages 1735–1737.

Muller et al., "J. Prakt. Chem," (2), vol. 146 (1936), pages 58–60.